United States Patent Office 3,597,495
Patented Aug. 3, 1971

3,597,495
THERMOSETTING COATINGS COMPRISING HYDROXY-FUNCTIONAL POLYURETHANE INTERPOLYMERS
Kazys Sekmakas, Chicago, and Joseph E. Gaske, Bridgeview, Ill., assignors to De Soto, Inc., Des Plaines, Ill.
No Drawing. Continuation-in-part of application Ser. No. 583,092, Sept. 29, 1966, now Patent No. 3,450,791. This application July 1, 1968, Ser. No. 741,300
Int. Cl. C08f 29/20; C08g 41/04
U.S. Cl. 260—850
16 Claims

ABSTRACT OF THE DISCLOSURE

Thermosetting solution coatings are provided by providing in organic solvent medium an hydroxy-functional polyurethane resin in admixture with a heat-hardening aminoplast resin. The polyurethane resin is typically formed by reacting an unsaturated hydroxy-functional polyester resin with a small proportion of organic diisocyanate with the hydroxy-functionality being in excess in order to provide an hydroxy-functional polyurethane. This polyurethane is then copolymerized with a small proportion of lipophilic monoethylenically unsaturated monomer. The coatings combine unusual hardness with unusual flexibility.

---

The present application is a continuation-in-part of our prior copending application Ser. No. 583,092, filed Sept. 29, 1966 now U.S. Pat. No. 3,450,791.

The present invention relates to polyurethane resins and to thermosetting solution coating systems containing the same. The invention enables the production of coatings which are significantly harder and more flexible than have heretofore been available.

In the invention, the polyurethane is a three component interpolymer, the use of three components in the proportions defined hereinafter enabling the good properties normally associated with acrylic or vinyl based interpolymers to be combined with sufficient cross-link density for good cure and sufficient flexibility to withstand severe impact and fabrication as is required for coatings to be used on metal sheets which are coated flat and later deformed to desired shape.

The three essential components and the proportion of their use are as follows:

(1) Polyethylenically unsaturated hydroxy functional polyester resin;
(2) Organic diisocyanate in an amount of from 0.1–20%, preferably from 0.5–5%; and
(3) Lipophilic ethylenically unsaturated monomer in an amount of from 1–25%, preferably from 3–15%.

The percentages are by weight based on the completed resin and the balance of the resin consists essentially of the polyester resin which provides excess hydroxy functionality beyond that required for complete reaction with the isocyanate functionality provided by the diisocyanate component.

As will be apparent, the diisocyanate and the lipophilic monomer will increase the molecular weight of the polyester component. Since the final resin is intended to be an organic solvent soluble resin, the starting polyester should be of relatively low molecular weight as is not unusual when dealing with unsaturated polyesters. Since the main building blocks of soluble polyesters are dicarboxylic acids and dialcohols (glycols), molecular weight is easily limited by having a high excess of hydroxy functionality over acid functionality, e.g., an excess of at least 20%, preferably at least 50%, and most unusually from 65% to 100%. Even as high as a 200% excess can be used. On the other hand, the polyester forming reaction should be reasonably complete as indicated by an acid number of less than 30, preferably less than 15.

Referring more particularly to the polyesters which may be used in accordance with the invention, these, as is well known, are produced by the polyesterification of polyhydric alcohols with polycarboxylic acids. The invention requires the utilization of a polyester having a considerable hydroxy functionality as is provided by the polyesterification of components which desirably contain at least 1.2 equivalents of hydroxy functionality per equivalent of carboxy functionality. Preferably, the ratio of hydroxy to carboxy is at least 1.5:1 and, to provide hydroxy functionality for eventual cross-linking, at least 25% by weight of the hydroxy-functional materials used should contain at least three hydroxy groups per molecule, these being illustrated by glycerine, trimethylol propane, pentaerythritol, and the like. Glycols such as ethylene glycol, propylene glycol, butylene glycol, diethylene glycol, neopentyl glycol, and the like, are desirably used. Dicarboxylic acids such as any of the phthalic acids or the anhydride of orthophthalic acid are normally used to form the polyester, but aliphatic acids such as adipic acid and succinic acid are also useful alone or in combination with the aromatic acids. Acids of higher functionality are preferably absent or their proportion minimized to minimize the tendency toward gelation. Monofunctional acids or alcohols may also be used, but are not controlling.

While the polyester may include an oil component, the polyesters of the invention are preferably oil-free.

Numerous ethylenically unsaturated polyesters may be employed after they have been modified by copolymerization with a small proportion of lipophilic monomer in accordance with the invention, it being understood that these polyesters are polyethylenically unsaturated and not monoethylenically unsaturated.

The unsaturation can be introduced into the polyester by the polyesterification of an unsaturated polycarboxylic acid such as maleic acid, fumaric acid, itaconic acid, aconitic acid, glutaconic acid or citraconic acid or by the polyesterification of an unsaturated polyhydric alcohol such as 2-butene-1,4-diol, thus providing highly reactive unsaturation in the linear backbone of the polyester.

On the other hand, unsaturation can be introduced into the unsaturated polyester resin through the presence of unsaturated side chains as by the use of unsaturated monofunctional components such as unsaturated monohydric alcohols or unsaturated monocarboxylic acids. Thus, a proportion of unsaturated monohydric alcohol may be used, such as allyl alcohol, methallyl alcohol or crotyl alcohol. Unsaturated monocarboxylic acids are illustrated by crotonic acid and by fatty acids containing conjungated unsaturation such as eleostearic acid, licanic acid, or dehydrated castor oil fatty acids, this conjugated unsaturation providing reactive double bonds to enable copolymerization. Incorporation of monocarboxylic acids is facilitated by the use of glycerine in the production of the polyester. When the glycerine polyester is preformed, the monoacid reacts with the secondary hydroxyl group of the glycerine residue but, as is known, the polybasic acid, the glycerine, and the monoacid may all be polyesterified together in a single reaction. Since the polyester used need not be of high molecular weight, the monofunctional acid or alcohol may function as a chain terminating agent. Other monofunctional agents are also usable to introduce unsaturation for copolymerization such as allyl glycidyl ether. In other words, the unsaturation in the polyester required for copolymerization is preferably selected from the group consisting of: (1) alpha,beta-unsaturation, (2) beta-unsaturation, (3) beta-gamma unsaturation, or (4) conjugated unsaturation.

Broadly, the unsaturated polyester resin should contain about 0.005 to 0.40 gram mol of ethylenically unsaturated component per 100 grams of polyester. Of course, the precise preferred proportion of unsaturation will vary depending on the reactivity of the unsaturated component (maleic acid is more reactive than crotonic acid). Moreover, practical aspects of processing must be kept in mind since, with less unsaturation, one may copolymerize for longer periods of time and/or more vigorous conditions. With some unsaturation, there is a tendency to gel, especially with more reactive materials such as maleic anhydride or acid. However, one can terminate the reaction before gelation, especially when the reaction is carefully supervised, or the reaction may be effected under very mild conditions. Preferably and when using polyester containing unsaturation in the backbone of the polyester as by using maleic acid, the polyester resin desirably contains 0.01–0.1 gram mol of unsaturated component per 100 grams of polyester. With less reactive polyesters such as those containing the unsaturation in a side chain as by the use of crotonic acid or allyl alcohol, the polyester resin desirably contains from 0.02–0.3 gram mol of unsaturated component per 100 grams of polyester.

While the molecular weight of the unsaturated polyester is of secondary significance so long as the polyester does not gel when reacted with diisocyanate and lipophilic monomer, it is desirable to employed polyesters which have a viscosity in n-butanol at 80% solids in the range of from C to Z–6, preferably in the range of from V to Z–2 measured on the Gardner-Holdt scale at 25° C.

The lipophilic monomers which may be used in the invention may be constituted by any monoethylenically unsaturated monomer having a lipophilic terminal group, e.g., a hydrocarbon chain containing at least 4 carbon atoms. In addition to such monomers as stearyl and lauryl acrylate, one can use the corresponding methacrylate. Butyl methacrylate is useful even though it is of minimal chain length and it is a desirable agent to select because of its lower cost, but 2-ethylhexyl acrylate is viewed as superior, and it is also of modest cost and readily available. Dibutyl maleate or fumarate may also be used, but monomers containing the $CH_2=C<$ group are preferred. As can be seen, alcohol esters of monoethylenic monocarboxylic acids are preferred especially acrylic acid, methacrylic acid and crotonic acid. Alcohols containing at least 6 carbon atoms are preferred.

The purpose of the lipophilic monomer is to obtain a sufficient modification in the wetting, cratering and flow characteristics in order to provide a system which is useful in roller coating while, at the same time, effecting such modification with only a minor portion of long chain vinyl monomer.

Normally, the reaction between a vinyl monomer and an unsaturated polyester resin is a cross-linking reaction which thermosets the polyester, but this is not the desired result in the practice of this invention. The small proportion of vinyl monomer with its long hydrocarbon chain that is used herein does not tend to thermoset the polyester resin but merely modifies its characteristics to provide the wetting and flow characteristics. which are desired.

While any organic diisocyanate is useful, aliphatic diisocyanates are preferably used in the practice of this invention. The use of aliphatic diisocyanates contribute to the achievement of good exterior exposure properties while the aromatic diisocyanates which may also be used do not provide the same good color retention, durability and chalk resistance. Preferably, the aliphatic portion of the compound is a divalent hydrocarbon radical containing at least 6 carbon atoms, preferably more than 10 carbon atoms. The hydrocarbon group may be straight, branched, or cyclic since all of these are useful in the practice of the invention. As has been indicated, aromatic diisocyanates such as toluene diisocyanate and the like are not equivalent to the aliphatic diisocyanates. Only diisocyanates can be used since higher functional compounds lead to gelation.

Examples of aliphatic diisocyanates which may be used include dicyclohexane-4,4'-diisocyanate, tetramethylene diisocyanate, hexamethylene diisocyanate, and the like. Another desirable diisocyanate is 4,4'-methylenebis (cyclohexyl isocyanate) which is a cycloaliphatic compound. Also useful are the diisocyanates based on fatty acid dimers such as that produced by dimerizing a $C_{18}$ fatty acid to obtain an aliphatic diisocyanate based on a 36 carbon divalent hydrocarbon radical.

Aliphatic ester diisocyanates are outstandingly useful, the carbonyl group in the ester apparently maximizing compatibility with the polyester at minimum chain length in the aliphatic group. These esters are typified by diisocyanates of caproic acid diisocyanates which have been esterified by lower ($C_1$–$C_4$) alcohols, these being typified in commerce by Lysine Diisocyanate which is the methyl ester of caproic acid diisocyanate. These aliphatic ester diisocyanates further enhance hardness and toughness.

It is stressed that while small proportions of diisocyanate are contemplated and preferred that these exhibit a profound effect on the resin which is produced. Thus, the incorporation of a small amount of aliphatic diisocyanate into the polyester results in a several fold increase in viscosity.

As will be appreciated, the isocyanate groups react vigorously with the excess of hydroxy groups present and are substantially completely consumed so that the final product is stable and is essentially devoid of isocyanate functionality.

From the standpoint of procedure, the polyester is first preformed utilizing a conventional polyesterification reaction which typically takes place at temperatures of about 240° C. It is also convenient to carry out the reaction with diisocyanate at temperatures of about 100 to 120° C., at which temperature the polyester is stable and will not increase in viscosity except through reaction with isocyanate. At the same time, the isocyanate reaction is very rapid, e.g., substantially instantaneous so that the reaction can be carried out in much the manner of a titration. In this way, the final viscosity can be very accurately controlled. It is also convenient to have the copolymerization reaction with the lipophilic monomer as a last step in the reaction since the copolymerization is reasonably easy to control, enabling molecular weight to be increased with minimum risk of gelation. On the other hand, it is possible to change the sequence of steps of reaction through the achievement of uniform results becomes somewhat more tedious and difficult.

The polyurethane interpolymers which have been produced as described hereinbefore are hydroxy functional and they are not significantly heat-hardening. Thus, they can be cured by reaction with organic solvent-soluble aminoplast resins which are heat-hardening condensates of excess formaldehyde with amines. This provides methylol groups which are highly reactive with the hydroxy functionality of the polyurethane interpolymer.

Typical solvent-soluble polymethylol compounds include urea-formaldehyde condensates, and melamine-formaldehyde condensates as well as aldehyde condensates with other triazines such as benzoguanamine. The aminoplast curing coreactant is used in an amount of from 5–95% by weight, based on the total weight of resin components.

It is desired to point out that typical thermosetting coating resins are exemplified by compositions containing N-methylol amides such as N-methylol acrylamide. These are not fully comparable to those provided by the invention since the invention permits harder and more flexible coatings to be produced. In this regard, appliance finishes have been formulated in accordance with the invention which have a pencil hardness as high as 6H in combination with the capacity to pass reverse impact testing at 120 in./lbs. The conventional N-methylol amide interpolymers and combinations thereof with other resins do not approximate such properties.

While the invention has been described in connection with combinations of polyurethane interpolymers and aminoplast resins, it will be understood that other resinous components such as alkyd resins, epoxy resins, vinyl resins, etc., are compatible and may be included in the mixture.

It will also be understood that the invention is illustrated, but not limited by the specific examples presented hereinafter. It will further be evident that the products of the invention, while useful in diverse types of heat-hardening resinous compositions are primarily useful in the coating art, in which event they are applied either alone or in combination with other resins, from a compatible organic solvent solution. These coating solutions may be pigmented or contain dyes, flow control agents, waxes and various other components as will be evident to those skilled in the art.

EXAMPLE 1

Part A

Preparation of unsaturated polyester-urethane

Charge into a reactor equipped with an agitator, reflux condenser, Dean-Stark trap and nitrogen inlet tube. Heat to 130° C. to melt:

| | Parts by weight |
|---|---|
| Adipic acid | 540 |
| Trimethylol propane | 520 |
| Neopentyl glycol | 820 |
| Xylol | 60 |

When the above ingredients are melted add and heat to 180–185° C. Hold at this temperature for 3 hours, then heat to 230–235° C. and hold for an acid value of 9–10.

| | Parts by weight |
|---|---|
| Isophthalic acid | 925 |
| Maleic anhydride | 35 |

Add

Viscosity: 15.5 poises

| | Parts by weight |
|---|---|
| Commercial mixed aromatic hydrocarbon solvent including minor amounts of aliphatic solvent having a boiling range of 306–343° F. | 950 |

Cool to 120° C., then add:

| | Parts by weight |
|---|---|
| 2-ethoxyethanol acetate | 300 |

Add over 30 minute period. Hold for 3 hours at 120° C.:

Viscosity—140 poises

| | Parts by weight |
|---|---|
| Lysine diisocyanate (alpha, epsilon-diisocyanato methyl caproate) | 35 |

Add

| | Parts by weight |
|---|---|
| Butanol | 300 |

The final characteristics of the product are:

| | |
|---|---|
| Solids (percent) | 60.6 |
| Viscosity (poises) | 42 |
| Color (Gardner) | 1 |
| Acid value | 9.7 |

Note 1, Example 1.—The melamine formaldehyde resin is a heat-hardenable solvent-soluble melamine-formaldehyde condensate etherified with butanol to provide solvent solubility and is employed in the form of a 55% by weight resin solids solution containing 25% butanol and 20% xylol. The melamine-formaldehyde resin is provided by heat reacting 5.5 mols of formaldehyde with 1 mol of melamine in the presence of excess butanol and a small amount of acid catalyst.

Part B

Preparation of polyester-urethane copolymer

Charge into reactor. Heat to 125–130° C.:

| | Parts by weight |
|---|---|
| Unsaturated polyester-urethane, Part A | 3000 |
| Commercial mixed aromatic hydrocarbon solvent including minor amounts of aliphatic solvent having a boiling range of 306–343° F. | 300 |

Premix and add over 1½–2 hours at 125–130° C. Hold for one hour:

| | Parts by weight |
|---|---|
| Butyl methacrylate | 180 |
| Cumene hydroperoxide | 45 |

Add. Hold for 2 hours at 125–130° C.:

| | Parts by weight |
|---|---|
| Cumene hydroperoxide | 30 |

The final characteristics of the product are:

| | |
|---|---|
| Solids (percent) | 56.9 |
| Viscosity (Gardner) V-W poises | 12 |
| Color (Gardner-Holdt) | 1 |
| Acid value | 9.3 |

EXAMPLE 2

The solution product of Example 1 (Part B) is incorporated into a thermosetting coating composition containing 28% by weight pigment (1.8% Phthalo Blue-98.2% titanium dioxide rutile) and 32% by weight of non-volatile resin. Various proportions of melamine-formaldehyde condensate (see note 1) in the form of a 55% solution thereof in butanol and xylol are used in order that 10%, 15%, 20% and 30% of the total resin is constituted by melamine-formaldehyde solids. It is found that the mixtures of the invention cure more rapidly than do conventional methylolated acrylamide interpolymers in that such interpolymers normally require about 60 seconds of exposure in a 475° F. oven before solvent resistance is acquired whereas, in the invention, solvent resistance (acetone resistance) is acquired on only a 45 second cure. In addition, greater hardness and flexibility is achieved in accordance with this invention.

EXAMPLE 3

Example 2 is repeated using the solution product of Part A of Example 1 in place of the solution product of Part B of Example 1. Metal panels coated and baked were inferior because of a pronounced tendency for the coating to crater on baking and for it to show sensitivity to grease and other surface imperfections.

EXAMPLE 4

Example 2 is repeated with much larger proportions of melamine-formaldehyde condensate, e.g., 50% and 70% of melamine-formaldehyde condensate based on total resin. In this way, appliance finishes having a pencil hardness of 6H and higher combined with a reverse impact resistance of from 120–160 inch/pounds are obtained.

Not only do the thermosetting coatings exhibit extreme hardness and flexibility, but they show excellent mar resistance even when no wax is incorporated in the coating and even when the coating is fully cured to maximize solvent resistance and hardness.

While the preferred materials include lipophilic monomer to provide desired wetting and flow characteristics, shorter chain monomers can be used such as ethyl acrylate, but the improved wetting and flow properties are sacrificed. Indeed, and by resort to appropriate flow control agents and wetting agents and in situations such as appliance coatings where wetting and flow are of lesser importance, the vinyl monomer can be entirely eliminated. In such instance, the unusual hardness and flexibility is still retained and can be used to advantage. It is stressed that these properties follow from the selection of an essentially oil-free hydroxy-functional polyester containing a proportion of hydroxy component including 3 or more hydroxy groups and which is preferably unsaturated as previously described. These polyesters in the absence of diisocyanate modification in accordance with this invention do not provide hard and flexible thermoset films in combination with aminoplast resin.

The unsaturation of the polyester can also be dispensed with, but this sacrifices some adhesion properties.

EXAMPLE 5

Example 3 is repeated by spray application so that the greater wetting and flow needed for high speed roller application is not required. The baked coatings are hard, tough and very mar resistant and satisfactory as an appliance finish.

EXAMPLE 6

Example 1, Part A is repeated with the exception that the 35 parts of maleic anhydride are omitted and Example 5 is repeated using the maleic-free solution so-obtained. Adhesion of the baked coating to a metal substrate is slightly impaired, but the product is still satisfactory.

The invention is defined in the claims which follow.

We claim:

1. An organic solvent-soluble hydroxy-functional polyurethane interpolymer resin comprising the non-gelled reaction product of:
   (1) polyethylenically unsaturated hydroxy-functional polyester resin;
   (2) organic diisocyanate in an amount of from 0.1–20% based on the weight of the resin; and
   (3) lipophilic monoethylenically unsaturated alcohol ester monomer containing a terminal hydrocarbon chain of at least 4 carbon atoms in an amount of from 1–25% based on the weight of the resin;

the balance of the resin consisting essentially of said polyester resin which provides excess hydroxy functionality beyond that required for complete reaction with the isocyanate functionality provided by the diisocyanate component.

2. A polyurethane resin as recited in claim 1 in which said diisocyanate is present in an amount of from 0.5–5%.

3. A polyurethane resin as recited in claim 1 in which said lipophilic monomer is present in an amount of from 3–15%.

4. A polyurethane resin as recited in claim 1 in which said polyester resin is produced by the polyesterification of components comprising polyhydric alcohol and dicarboxylic acid, the ratio of hydroxy to carboxy being at least 1.5:1.

5. A polyurethane resin as recited in claim 4 in which at least 25% of the hydroxy-functional materials used to form said polyester contain at least three hydroxy groups per molecule.

6. A polyurethane resin as recited in claim 1 in which said polyester contains unsaturation in the backbone of the polyester in an amount of from .01–0.1 gram mol of unsaturated component per 100 grams of polyester.

7. A polyurethane resin as recited in claim 1 in which said unsaturated polyester contains about 0.005 to 0.40 gram mol of ethylenically unsaturated component per 100 grams of polyester.

8. A polyurethane resin as recited in claim 1 in which said polyester resin has a viscosity in n-butanol at 80% solids in the range of C to Z–6 on the Gardner-Holdt scale at 25° C.

9. A polyurethane resin as recited in claim 1 in which said diisocyanate is an aliphatic diisocyanate.

10. A polyurethane resin as recited in claim 9 in which said aliphatic diisocyanate is an ester.

11. A polyurethane resin as recited in claim 10 in which said ester is the methyl ester of caproic acid diisocyanate.

12. A polyurethane resin as recited in claim 1 in which said lipophilic monomer is an alcohol ester of a monoethylenically unsaturated monocarboxylic acid.

13. An organic solvent solution thermosetting coating composition comprising organic solvent having dissolved therein the hydroxy-functional polyurethane resin defined in claim 1 in admixture with heat-hardening, solvent-soluble aminoplast resin.

14. A coating composition as recited in claim 13 in which said aminoplast resin is a melamine-formaldehyde condensate.

15. A metal substrate having adhered to a surface thereof a baked coating of the solution defined in claim 13.

16. A method of producing an organic solvent-soluble hydroxy-functional polyurethane resin comprising reacting a polyethylenically unsaturated hydroxy-functional polyester resin with a minor amount of organic diisocyanate, said polyester resin being the reaction product of dicarboxylic acid with a mixture of dialcohol and trialcohol with at least 25% by weight of the hydroxy functional materials being trialcohol and said polyester providing excess hydroxy functionality beyond that required for complete reaction with the isocyanate functionality provided by said diisocyanate, and then copolymerizing the polyurethane resin so-produced with lipophilic monoethylenically unsaturated alcohol ester monomer containing a terminal hydrocarbon chain of at least 4 carbon atoms, said organic diisocyanate being employed in an amount of from 0.1% to 20% and said lipophilic monomer being employed in an amount of from 1–25%, based on the weight of the resin.

References Cited

UNITED STATES PATENTS

| | | | |
|---|---|---|---|
| 2,777,831 | 1/1957 | Seeger et al. | 260—850 |
| 2,850,474 | 9/1958 | Maxey | 260—850 |
| 2,879,248 | 3/1959 | Nischk et al. | 260—859 |
| 2,915,493 | 12/1959 | Nischk et al. | 260—859 |
| 3,008,917 | 11/1961 | Park et al. | 260—859 |
| 3,281,378 | 10/1966 | Garber et al. | 260—75TNK |
| 3,368,988 | 2/1968 | Sekmakas | 260—849 |

FOREIGN PATENTS

| | | | |
|---|---|---|---|
| 631,690 | 11/1961 | Canada | 260—859 |

JOHN C. BLEUTGE, Primary Examiner

U.S. Cl. X.R.

117—132, 161; 260—22, 31.4, 33.4, 33.6, 39, 40, 75, 859